United States Patent [19]
Hashimoto et al.

[11] Patent Number: 5,819,473
[45] Date of Patent: Oct. 13, 1998

[54] VEHICLE DOOR

[75] Inventors: Hideyuki Hashimoto; Yoshio Hosaka, both of Aichi, Japan

[73] Assignee: Asahi Glass Company Ltd., Tokyo, Japan

[21] Appl. No.: 732,722

[22] Filed: Oct. 18, 1996

[30] Foreign Application Priority Data

Oct. 20, 1995 [JP] Japan .................................. 7-273233

[51] Int. Cl.⁶ ........................................................ B60J 5/04
[52] U.S. Cl. ................................................ 49/502; 49/380
[58] Field of Search .............................. 49/502, 501, 374, 49/380

[56] References Cited

U.S. PATENT DOCUMENTS 4,785,585  11/1988  Grier et al. .
5,251,403  10/1993  Compeau et al. .
5,367,832  11/1994  Compeau et al. .

FOREIGN PATENT DOCUMENTS 63-53112  3/1988  Japan .

Primary Examiner—Daniel P. Stodola
Assistant Examiner—Curtis Cohen
Attorney, Agent, or Firm—Oblon, Spivak, McClelland, Maier & Neustadt, P.C.

[57] ABSTRACT

A vehicle door comprising an outer panel which is attached to a vehicle body so as to be openable and closable, an inner panel which has a peripheral dimension smaller than that of a panel portion of the outer panel, and which is attached to an interior side of the outer panel, door equipment including at least window glass, a regulator for raising and lowering the window glass, and a door lock, and an inner trim for covering an interior side of the inner panel, wherein the inner panel and the outer panel are secured together so as to form a space therebetween, the door equipment and the inner panel form a door module so that a side of the inner panel confronting the outer panel is provided with the door equipment in a one-piece unit, and the door module is attached to the outer panel so as to position the door equipment in the space by attaching the inner panel to the outer panel.

8 Claims, 6 Drawing Sheets

VEHICLE DOOR

BACKGROUND OF THE INVENTION

1. Field of the Invention

The present invention relates to a vehicle door and more particular to a vehicle door which can be easily assembled at a body rigging line.

2. Discussion of Background

A typical vehicle body is completed by jointing stamped steel plate parts at a body welding line to prepare several subassemblies, painting a white body assembled from the subassemblies at a body painting line, and then attaching equipment to the painted body at a body rigging line.

A conventional vehicle door has a door outer panel and a door inner panel made of stamped steel plate parts, and the door outer panel and the door inner panel are subjected to hemming and spot-welding at the body welding line to assemble the door subassemblies, providing the door. After the assembled door is mounted to the body using hinges, painting including electrocoating, intermediate coating and finish coating is applied to the door at the body painting line, and equipment such as window glass and a window regulator is finally attached to the door at the body rigging line.

With regard to such a vehicle door made of stamped steel plate parts, attaching the equipment is carried out in such a situation that the door has been completely painted, i.e. that the door outer panel and the door inner panel have been jointed. It is usual that the equipment is attached to the door through an access opening formed on the door inner panel.

However, attaching the equipment through the access opening in the door inner panel has extremely bad operating performance. In particular, e.g. the door glass and the window regulator are large parts. As a result, it takes long time to handle these large parts to attach the parts into the door at the body rigging line, and there is a possibility that the completely painted body is damaged. Since the attachment operation of the large parts through the narrow access opening involves complicated steps, it is extremely difficult to automatize the operation even if e.g. an excellent industrial robot is used.

It has been proposed that the door outer panel is made of a synthetic resin, and that a skeleton sandwiched between the door outer panel and the door inner panel has door equipment attached thereto to improve the operation for assembling the door (see e.g. JP-A-6353112).

In the vehicle door disclosed in the publication, the skeleton has window glass sashes, and the skeleton is mounted to the body through hinges. In other words, the skeleton forms a main body of the door, and the door inner panel and the door outer panel work as only covers for covering the interior side and the exterior side of the skeleton.

The door equipment is attached to the skeleton. The proposal has a disadvantage in that the operation for handling in the skeleton and the door equipment is not effective in attaching the door equipment because the skeleton itself is the main body of the door.

When the door equipment has been attached to the skeleton, it is usually difficult to carry out repairing operation without additional operation if a fault in the door equipment is found after the skeleton has been attached to the body (irrespectively of prior to and after completion of the vehicle), or if the door equipment is required for maintenance in the future. In such a case, if the skeleton itself is removed from the body, poor handling of the skeleton makes the repairing operation for the door equipment difficult because the skeleton is the main body of the door as stated earlier.

Because the skeleton forms the main body of the door with the window glass sashes as explained, each type of car necessarily requires preparation of a skeleton suited to the shape of the car. It is difficult to cope with recent car demand which requires a variety of sizes in small run, and production control is complicated.

On the other hand, U.S. Pat. No. 4,785,585 proposes that the door equipment be formed integrally with a module plate to provide a door module, and that the door module be attached to a door panel. A door inner panel of the door panel has an opening formed therein. The door module can be inserted into the door panel through an opening to improve ease of assembly of the door.

The door disclosed in the U.S. Patent has a cavity formed between the inner panel and an outer panel, and the door module is attached into the cavity. The door module is inserted into the cavity through the opening for attachment because the inner panel has the opening formed therein as stated. At that time, the door module is attached into the cavity by lifting the door module from the lower end toward the upper end of the opening to insert window glass into a belt line formed between the inner panel and the outer panel as shown in the U.S. Patent.

In order to handle the door module for inserting into the opening in the operation for inserting and attaching the door module, two-dimensional movement or three-dimensional movement in some instances is required. Specifically, the door module is moved in a direction perpendicular to a surface of the opening (a first direction: a direction for advancing the door module toward the opening), and a direction in parallel with the surface of the opening (a second direction from the lower end of the opening toward the belt line) until the door module has been attached into the cavity. For the attachment of the door module, the movement of the door module in the vicinity of the opening is one that is at least a combination of the movement in the first direction and the movement in the second direction. Such movement is a bar to automatize the manufacture of vehicles including doors. Rapid and simple assembly of doors by a robot in an assemble line for vehicles can significantly contribute to automation of the manufacture of the vehicles. However, the movement which is constituted by combined movement in a plurality of directions is complicated. It is not easy to carry out attachment of such a door module into the cavity by use of a robot.

In the door disclosed in the U.S. Patent, the door module as a whole becomes a large part due to the integration of the door equipment thereto. For this reason, it is necessary to cope with the problem stated, which is inherent to the large part in handling the large part for attachment, and which is not created when the door equipment is independently attached as usual. Since the door according to the U.S. Patent is proposed without considering the problem due to an increase of the size of part, it is not possible to improve the assembling operation for the door though the door equipment is formed integrally with the module plate.

It is an object of the present invention to provide a vehicle door which is capable of improving the operation for assembling the door equipment.

SUMMARY OF THE INVENTION

In order to attain the object, the present invention provides a vehicle door comprising an outer panel which is mounted to a vehicle body so as to be openable and closable; an inner panel which has a peripheral dimension smaller than that of a panel portion of the outer panel and which is attached to an interior side of the outer panel; door equipment including at least window glass and a regulator for raising and lowering the window glass; and an inner trim for covering an interior side of the inner panel; wherein the inner panel and the outer panel are secured together so as to form a space therebetween; the door equipment and the inner panel form a door module so that a side of the inner panel confronting the outer panel is provided with the door equipment in a one-piece unit; and the door module is attached to the outer panel so as to position the door equipment in the space by attaching the inner panel to the outer panel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, an embodiment according to the present invention will be described in detail in reference to the accompanying drawings.

Figure 1:
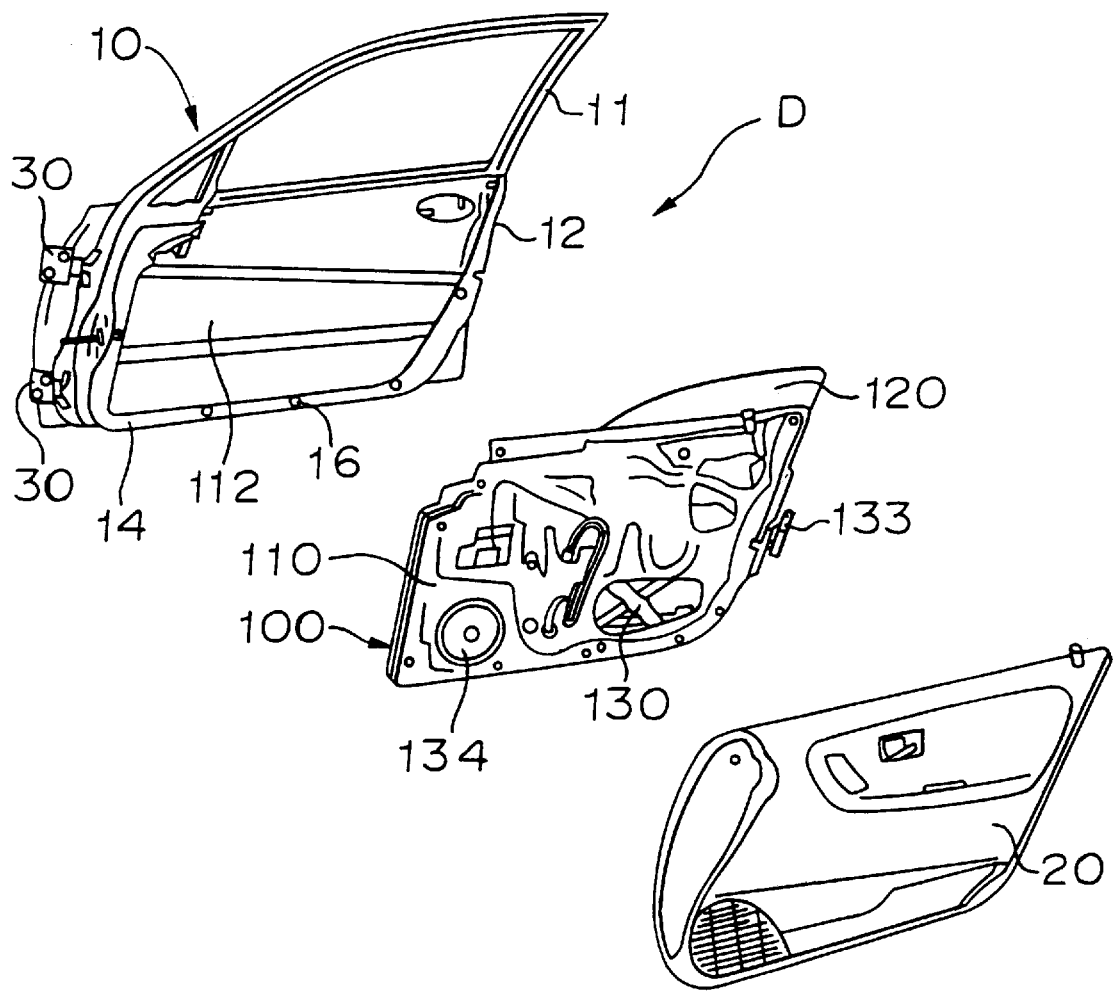
FIG. 1 is an exploded perspective view of the vehicle door according to an embodiment of the present invention.
Figure 2:
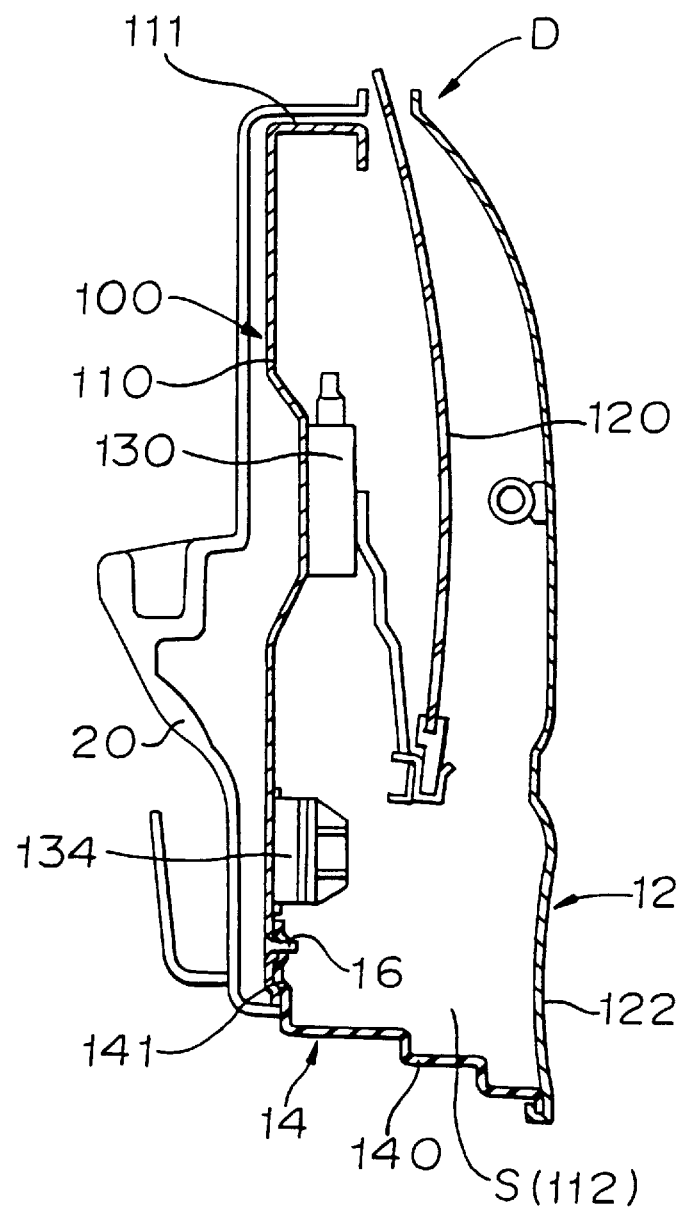
FIG. 2 is a vertical cross-sectional view of the door of FIG. 1.

In FIG. 1, there is shown an exploded perspective view of an example of the vehicle door according to the present invention. In FIG. 2, there is shown a vertical cross-sectional view of the essential parts of the example shown in FIG. 1.

As shown in FIG. 1, the vehicle door D is mainly constituted by an outer panel 10, a door module 100 comprising an inner panel 110 and door equipment integrally formed with the inner panel, and an inner trim 20 for covering an interior side of the inner panel 110. The door equipment is attached to a surface of the inner panel 110 confronting the outer panel 10. The door equipment is arranged so as to be positioned in a space S which is formed between the outer panel 10 and the inner panel 110. The space S is concealed by the inner panel 110 to become a substantially closed one when the space is formed between the outer panel 10 and the inner panel 110. The outer panel 10 has a panel portion 12 provided with a dish-like recessed portion 112. The space S is provided by the recessed portion 112. The panel portion 12 has a flange 14 at outer peripheral edges of the recessed portion 112, and the flange has a plurality of apertures 16 for joint to the inner panel 110.

The outer panel 10 is fabricated by welding a door upper sash 11 to a panel which is prepared by drawing a steel plate with a press. The outer panel is mounted to a door opening of a vehicle body by two hinges 30, 30 which are attached to a front side surface of the outer panel.

The flange 14 is constituted by wall pieces 140 which substantially perpendicularly extend toward an interior side of the vehicle from right and left side edges and a lower edge of a main body 122 of a panel portion 12 forming a outer surface of the door D, and flange pieces 141 which extend from ends of the wall pieces 140 remote from the main body toward a central portion of the door. The extended wall pieces 140 and the surrounding flange pieces 141 form the recessed portion 112 so as to make an opening narrow in width. The opening formed by the flange pieces 141 is designed to be smaller than peripheral dimensions of the inner panel 110 by providing the extension of the flange pieces 141 with a certain length. On the other hand, the inner panel 110 has peripheral dimensions designed to be smaller than those of the panel portion 12. As a result, the inner panel 110 can be attached to the door outer panel 10 so as to be invisible from the side of the outer surface of the door.

The opening formed by the flange pieces 141 is larger than peripheral dimensions of window glass 120. As a result, it is possible to facilitate an operation for attaching the door module 100 to the outer panel 10. When the door module is attached to the outer panel 10, the door module 100 is advanced toward the outer panel 10 from a direction perpendicular to the outer panel 10. At that time, the advance of the door module in the perpendicular direction allows the door equipment including the window glass 120 to be stored in the space S without any special step. Conversely, the inner panel 110 has peripheral portions engaged with the flange pieces 141, preventing the inner panel from entering the space S. In that manner, the space S is formed by the outer panel 10 and the inner panel 110 while the space S has the door equipment arranged therein.

As clearly shown in FIG. 2, the inner panel 110 has an upper portion (in the vicinity of the belt line of the door) provided with an a reinforced portion 111. According to the present invention, the inner panel itself constitutes a module plate. It introduces a possibility of insufficiently satisfying the standards required as a vehicle door in comparison with the door structure disclosed in the U.S. Pat. No. 4,785,585. The door according to the U.S. Patent may be obtained sufficient strength by the inner panel and the outer panel because the door equipment is integrally formed with a module plate separated from the inner panel. On the other hand, when the inner panel itself is used as a plate for attaching the door equipment like the present invention, a portion of the door in the vicinity of the belt line is constituted by the outer panel and the plate for attaching the door equipment. Such an arrangement introduces the danger of lowering the strength in comparison with the door according to U.S. Patent.

Figure 4:
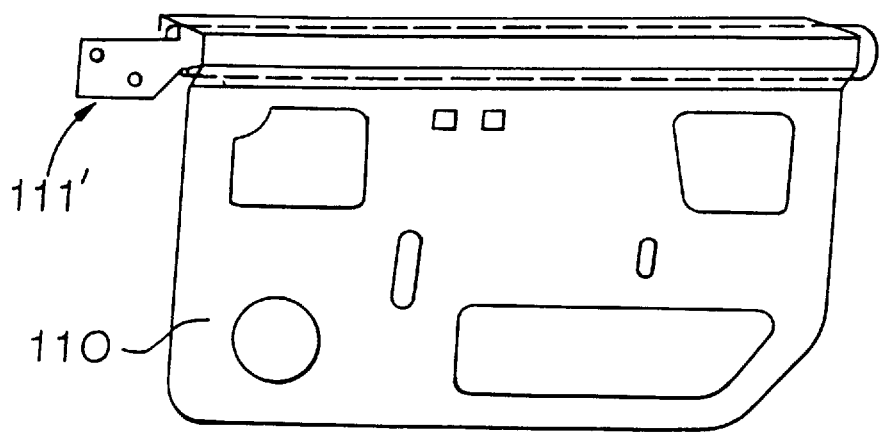
FIG. 4 is a vertical cross-sectional view of the essential parts in an example of an upper end of an inner panel according to the present invention.

In order to sufficiently satisfy the standards, the inner panel 110 has the upper portion provided with the reinforced portion 111 as stated earlier. According to the embodiment, a bent structure is provided to the upper portion of the inner panel 110 to form the reinforced portion 111 as shown in FIG. 2. As other examples, the inner panel upper portion may have an overlapping structure of steel plates, a hollow structure and a greater thickness than the other portions, and may have the hollow portion of the hollow structure or the bent portion of the bent structure provided with a core member 111' such as a pipe (see FIG. 4).

Although the door module 100 has a separate design depending on the type of each vehicle, it would be proposed that the door module 100 can be commonly used among several types of vehicles. Even if there is a difference in the details of the module such as the presence and absence of a speaker, or a difference in the size of the window glass, it is possible to commonly use the door module among several kinds of vehicles without increasing the number of the kinds of the door module in comparison with the number of kinds of vehicles or the differences in the details of the door module.

Although the size of the door itself is usually different when the kind of the vehicle is different, it is possible to commonly use the door module in not only a kind of vehicle with a great door but also a kind of vehicle with a small door by providing the extension of the flange pieces 141 of the flange 14 with a sufficient length.

In that case, desired attaching accuracy between the door module and the outer panel can be easily obtained only by aligning attaching holes in the inner panel 10 with the apertures 16 formed in the flange pieces 141.

The operation for attaching the inner panel and the respective pieces of the equipment attached thereto is extremely easy and positional accuracy is significantly high because it is not necessary to carry out the operation through the narrow access opening unlike the conventional attachment. Further, assembling accuracy of the door equipment such as the window glass to the door is extremely high since the attaching accuracy between the inner panel and the outer panel is high as stated earlier. The operation for obtaining such high accuracy is simple.

When the location of the apertures 16 in the flange for obtaining such accuracy is fixed, it is possible to simply assemble the door equipment to the door with high accuracy only by preparing a door module accordingly.

The door module 100 for a vehicle according to the embodiment is prepared so that the glass window 120, a regulator 130, front and rear lower sashes, a door lock 133, harness and a speaker 134 are attached to the inner panel 110 in a modular construction, and that the door module with those parts integrally attached thereto can be assembled to the outer panel 10. Since a side of the inner panel 110 facing the outer panel 10 has the door equipment such as the window glass 120 attached thereto, the door equipment can be stored in the space S in the door which is formed by the outer panel 10 and the inner panel 110.

By the way, respective pieces of the door equipment have wires such as cords and cables connected thereto for operating the pieces in the door. The wires are bundled to form wire-harness, and the wire-harness is extended to be connected to a body-side power source outside the door. The wire-harness has a leading end provided with a connector, and the connector can be coupled with a body-side connector connected to the body-side power source to provide power to the door equipment from the body-side power source.

Figure 5A:
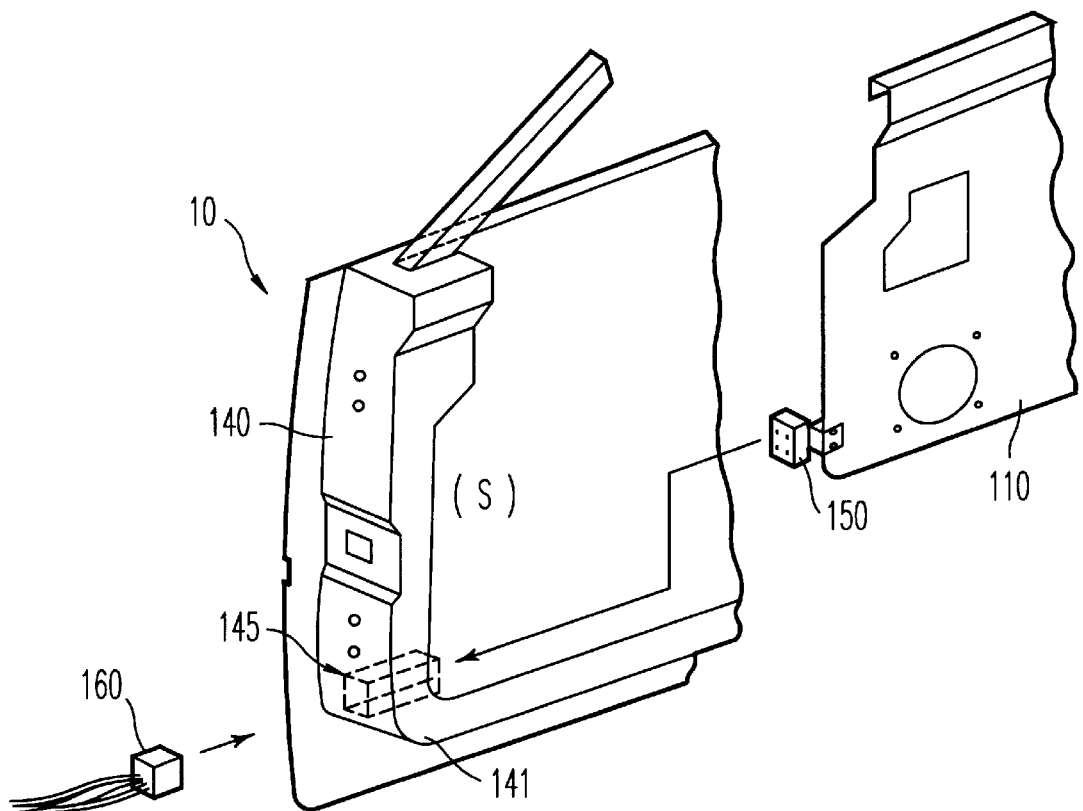
FIGS. 5(a) and 5(b) are a schematic perspective view of the essential parts and a schematic cross-sectional view of the essential parts, explaining how to arrange wire-harness in an example according to the present invention.
Figure 5B:
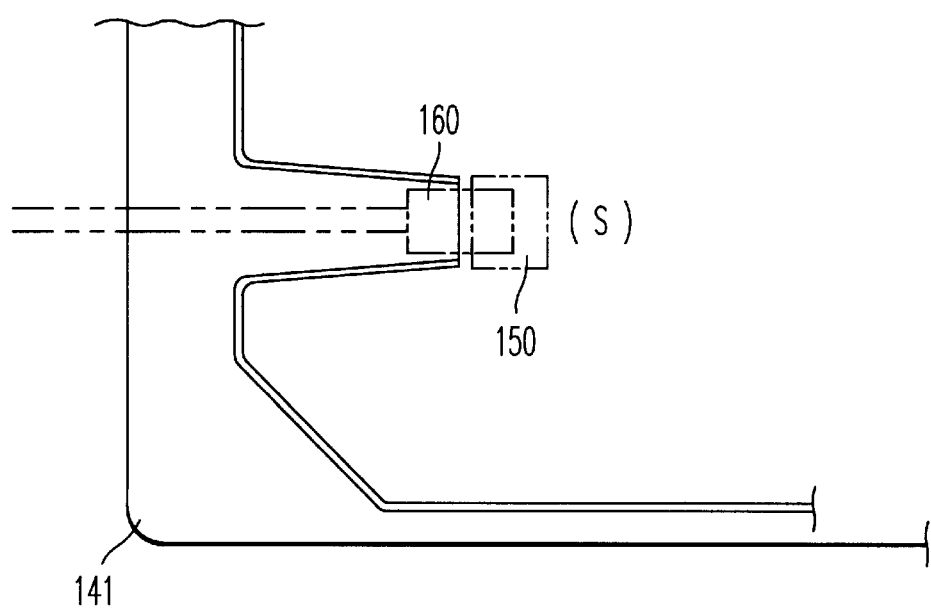

In FIGS. 5(a) and 5(b), there are shown an example of a schematic perspective view and a schematic cross-sectional view of the essential parts to explain how to extend the wire-harness according to the present invention. The outer panel 10 has a wall piece 140 formed with a through hole 145, and the through hole 145 projects from the wall piece 140 to extend toward the space S. The inner panel 110 has a door-side connector 150 fixed at a location which corresponds to the position which the through hole 145 occupies when the door module 100 is attached to the outer panel 10. To the door-side connector 150 is coupled the wire-harness for the door equipment.

When the door module 100 is attached to the outer panel 10, the door-side connector 150 is arranged in the vicinity of the outlet of the through hole 145 of the outer panel 10. When the door module 100 is attached to the outer panel 10 to assemble the door, the body-side connector 160 is coupled to the door-side connector 150 through the through hole 145 in order to provide power to the door equipment from the body-side power source.

Since the peripheral dimensions of the inner panel are larger than those of the opening as stated earlier, it is difficult to advance the door module substantially perpendicularly to the outer panel if the door-side connector projects from an outer peripheral portion of the inner panel. Such difficulty can be solved by fixing the door-side connector 150 without projecting the door-side connector 150 from the outer peripheral portion of the inner panel 110 toward the space S and projecting the through hole 145 into the space S beyond the flange piece 141 of the outer panel 10. Although it is seen in the shown example as if the door-side connector projects from the outer peripheral portion of the inner panel in order to clearly show the door-side connector itself, the door-side connector does not project in practice.

Figure 6A:
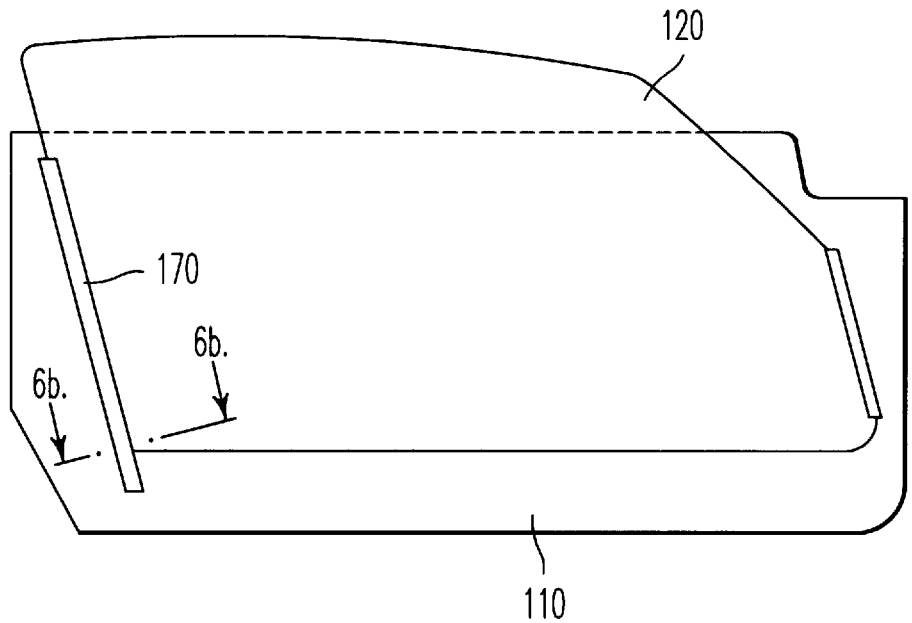
FIGS. 6(a) and (b) are a schematic front view and a cross-sectional view taken along the line A—A of FIG. 6(a) showing an example of a mounting structure for attaching lower sashes and window glass to the inner panel according to the present invention.
Figure 6B:
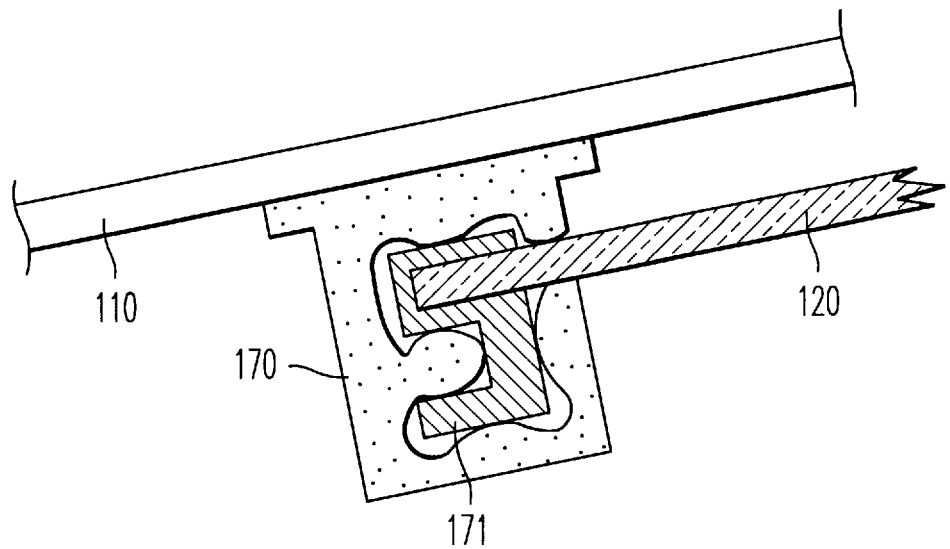

In FIGS. 6(a) and (b), there are shown a schematic front view (a view seen from the side of the outer panel) and a cross-sectional view taken along the line A—A of FIG. 6(a), showing an example of the structure to attach lower sashes and the window glass to the inner panel according to the present invention.

The lower sashes 170 have flanges fixed to portions of the inner panel 110 in the vicinity of both sides by screws. The window glass 120 has lower sides fixedly provided with glass guides 171. The respective lower sashes 170 have grooves formed therein in a direction along both sides of the inner panel to slide the glass guides 171. The window glass 120 can be raised and lowered by vertically sliding the glass guides 171 in the grooves of the lower sashes 170. Although raising and lowering the window glass is carried out by the regulator, the regulator is not shown in FIGS. 6(a) and (b).

In the embodiment, the lower sashes 170 and the glass guides 171 are made of a rigid resin. Although the lower sashes and the glass guides can be made of a metallic material, it is preferable to make these members of the rigid resin, considering reduction in the weight of the door and ease in the assembly. The glass guides 171 are fixed to lower portions of both sides of the window glass 120. As measures to fix the glass guides, there are several measures such as fixing to the window glass by bonding and mechanical fixing by use of holes formed in the window glass.

Now, a method for assembling the vehicle door will be explained.

Figure 3:
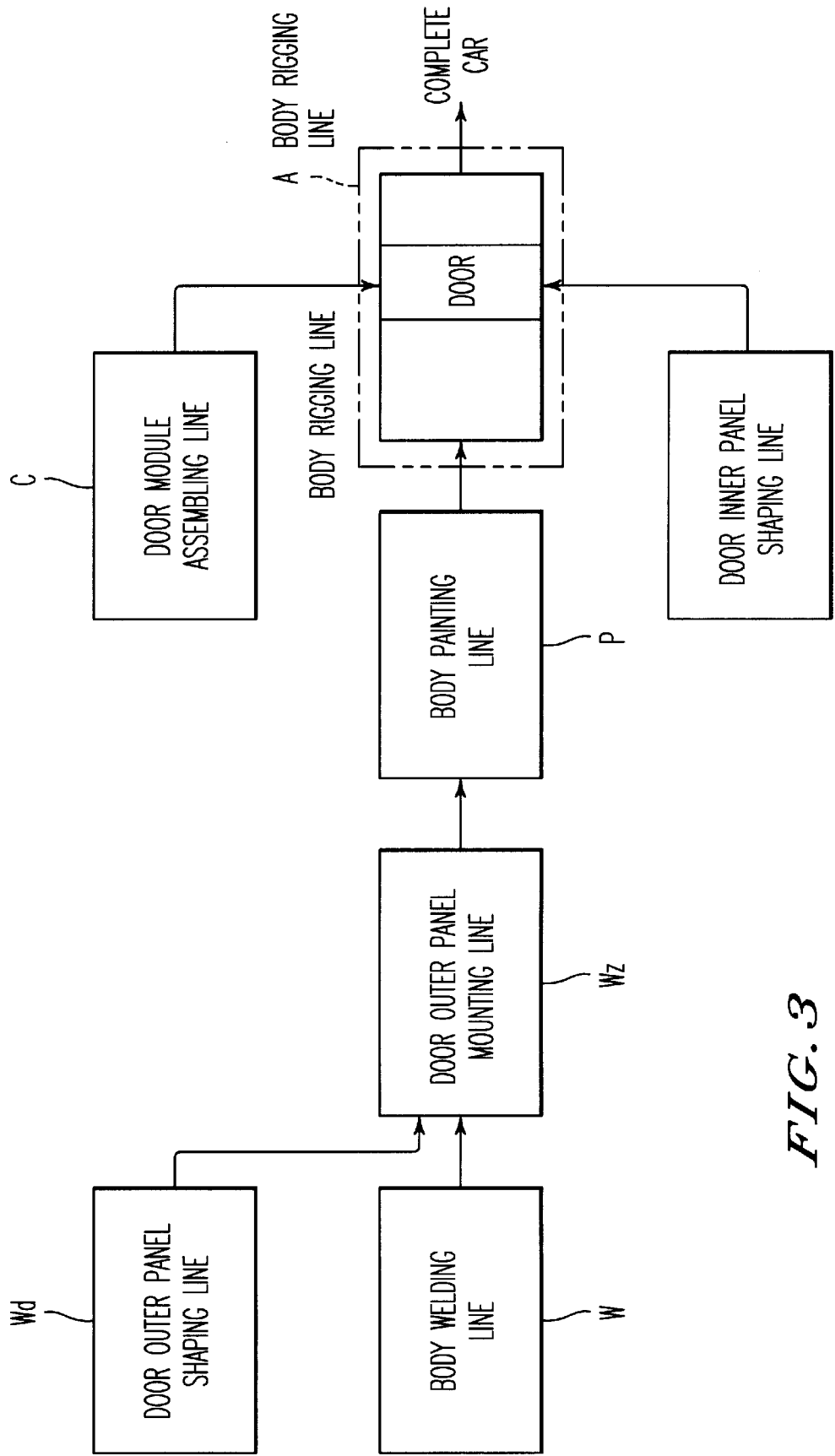
FIG. 3 is a flow diagram showing how to assemble the vehicle door as an example.

In FIG. 3, there is shown a flow diagram of an example of the method for assembling the vehicle door according to the present invention.

In a body welding line W, various panels such as an under body and an upper body are assembled, and covering parts such as an outer panel and a hood panel is mounted to a body at the final step in the line.

The outer panel 10 is shaped at an outer panel shaping line (press line) Wd, and then the outer panel is transferred to an outer panel mounting line Wz where the outer panel is mounted to the body by use of the door hinges 30, 30. At that time, adjustment of the gap between the outer panel 10 and the door opening, or so-called mounting adjustment is carried out. Since the vehicle door D according to the embodiment is not removed after the door is mounted to the body in the outer panel mounting line Wz following the welding line, it is enough to carry out the mounting adjustment once.

A white body with the outer panel 10 mounted thereto is transferred to a body painting line P where electrocoating, intermediate coating and finish coating are applied to the white body, preserving treatment is applied to the back of a floor panel, and sealing treatment for weather seal is applied. The completely painted body thus painted is transferred into a body rigging line A.

On the other hand, the door module 100 is prepared by assembling the window glass 120, the regulator 130, the front lower sash, the rear lower sash, the door lock 133, the wire-harness and the speaker 134 to the inner panel 110 at a separate process, and the door module 100 is transferred into the body rigging line A.

In the body rigging line A, the door module 100 is attached to the outer panel 10 in the situation shown in FIG. 1, i.e. in such a situation that the outer panel 10 is opened. The attachment of the door module 100 is a simple operation wherein the door module 100 can be advanced in the direction perpendicular to the outer panel 10 and attached to the outer panel without any special steps in such a situation that the outer panel 10 has been mounted to the body. The attachment of the door module is suited to automation using a robot or a special purpose machine.

After the inner panel 110 has right and left side edges and a lower edge jointed to the flange 14 of the outer panel 10 by use of bolts, the inner trim 20 is attached to the inner panel. After that, the door assembling steps is completed by attaching an outer door handle and the like to the door.

As explained, in accordance with the method to assemble the vehicle door according to the embodiment, every piece of the door equipment is assembled in a modular construction in advance so as to obtain easy handling, and the door module 100 is attached to the outer panel 10 in such a situation that only the outer panel has been mounted to the body. As a result, it is possible to extremely shorten time required for assembly in the body rigging line A.

The embodiment stated earlier is an example which has been described so as to easily understand the vehicle door module and the vehicle door according to the present invention. The present invention is not limited to the embodiment. For example, the material, the shape and the structure of the inner panel may be modified as they fit to the requirements of the vehicle door.

The outer panel and the inner trim may be modified as well. Although in the embodiment the panel portion 12 of the outer panel 10 which forms the outer surface for the door is the main body of the door, and the panel portion 12 has the upper portion provided with the door sash 11, the present invention is applicable to the door of e.g. a hard top type of vehicle which has no door sash 11. In such a type of vehicle, the outer panel 10 has no door sash 11.

The shape and the structure of the panel portion 12 may be also modified as long as the panel portion can prevent the door equipment from be exposed to an exterior side of the vehicle by the presence of the space S formed between the panel portion and the inner panel. Although in the embodiment there are provided the flange pieces at the right and left side edges and at the lower edge of the panel portion, there may be provided the flange pieces only at the right and left side edges, only one of the right and left side edges, only at the lower edge or at a portion of an upper edge of the panel portion (the upper edge normally has an opening for raising and lowering the window glass). The panel portion may be formed in a desired shape so that it does not have difficulty in attaching the inner panel to the outer panel.

The vehicle door according to the present invention may be assembled in a door subline separate from the body rigging line, and mounted to the body after the inner panel and the inner trim fabricated in a modular construction have been assembled to the outer panel. In the embodiment stated earlier, the inner panel and the inner trim in the modular construction are assembled to the outer panel at the body rigging line in such a situation that the outer panel has been mounted to the body. The vehicle door according to the present invention is applicable to both processes. As explained, it is preferable to carry out the attachment of the door module with the outer panel mounted to the body in terms of simplification in the process for mounting the door to the body, and matching in a painted color.

It is preferable that the inner panel according to the present invention is detachably attached to the outer panel, and that the inner trim according to the present invention is detachably attached to the outer panel. This is because only removable of the inner trim and the inner panel from the outer panel allows not only the window glass and the regulator but also the door equipment attached in the door to be checked, serviced and exchanged for maintenance of a complete car. In the embodiment, the outer panel has the dish-like recessed portion provided therein for attachment of the door module. The provision of the recessed portion allows the space for storing the door equipment to be formed between the outer panel and the inner panel by attaching the inner panel to the outer panel just like a lid.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle door comprising:
    an outer panel adapted to be mounted to a vehicle body so as to be openable and closable;
    a door module for mounting to an interior side of said outer panel said door module including an inner panel which has a peripheral dimension smaller than that of a panel portion of the outer panel, and at least a window glass and a regulator for raising and lowering the window glass, thereby forming a one-piece unit;
    an inner trim for covering an interior side of the inner panel; and
    means for mounting said door module to said outer panel by motion in only one direction substantially transverse to said outer panel;
    wherein the door module and the outer panel are secured together so as to form a space therebetween,
    and wherein the door module is attached to the outer panel so as to position said at least a window glass and a regulator in the space formed by attaching the door module to the outer panel.

2. A vehicle door according to claim 1, wherein the outer panel has a main body forming an outer surface of the door and constituted by the panel portion, the panel portion having a dish-like recessed portion for attaching the door module thereto.

3. A vehicle door according to claim 2, wherein the panel portion comprises the main body forming the outer surface of the door, and a flange which extends from right and left side edges and a lower edge of the main body toward a central portion of the panel portion to attach the door module thereto.

4. A vehicle door according to claim 3, wherein the flange comprises wall pieces which perpendicularly extend from the right and left side edges and the lower edge of the main body toward an interior side of the vehicle, and wherein said means for mounting said door module comprises mounting flange pieces which extend from ends of the wall pieces remote from the main body toward a central portion of the door.

5. A vehicle door according to claim 4, wherein said mounting flange pieces form a mounting surface for mounting the door module, wherein said mounting surface has a peripheral area smaller than the peripheral dimension of the inner panel and greater than the window glass.

6. A vehicle door according to claim 5, wherein said vehicle door further comprises a wire-harness and a door-side connector coupled to said wire-harness included on said door module, wherein a wall piece which extends from a side edge of the outer panel has a through hole extended to the space so as to project from a flange piece so as to pass a body-side connector for connecting the wire-harness to a body-side power source, and wherein the door-side connector is fixed at such a position not to project from a periphery of the inner panel so that the door-side connector is located at a position in proximity to an outlet of the through hole on the side of the space when the door module is attached to the outer panel.

7. A vehicle door according to claim 4, wherein the door module further includes a wire-harness and a door-side connector coupled to the wire-harness, a wall piece which extends from a side edge of the outer panel has a through hole extended to the space so as to pass a body-side connector for connecting the wire-harness to a body-side power source, and the door-side connector is fixed to the inner panel so that the door-side connector is located at a position in proximity to an outlet of the through hole on the side of the space when the door module is attached to the outer panel.

8. A vehicle door according to claim 1, wherein the outer panel comprises a panel portion which has a dish-like recessed portion for attaching the door module, and a door sash.

* * * * *